(12) United States Patent
Sikri et al.

(10) Patent No.: US 9,025,576 B2
(45) Date of Patent: May 5, 2015

(54) APPARATUS AND METHOD FOR EMPLOYING A TUNE-AWAY OPERATION TO COMMUNICATE SIMULTANEOUSLY WITH A PLURALITY OF CHANNELS

(71) Applicants: QUALCOMM Incorporated, San Diego, CA (US); Denise Ellen Robinson, West Sussex (GB)

(72) Inventors: Divaydeep Sikri, Farnborough (GB); Mungal Singh Dhanda, Slough (GB); Nigel Phillip Robinson, Farnborough (GB); Simon Walke, Basingstoke (GB); Abeezar A. Burhan, Farnborough (GB); Ramesh Kumar Gengiti, Farnborough (GB); Kishore Kumar Yannakula, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 13/739,738

(22) Filed: Jan. 11, 2013

(65) Prior Publication Data

US 2014/0119345 A1 May 1, 2014

Related U.S. Application Data (60) Provisional application No. 61/721,118, filed on Nov. 1, 2012.

(51) Int. Cl.
*H04J 3/00* (2006.01)
*H04W 36/06* (2009.01)
(Continued)

(52) U.S. Cl.
CPC .............. *H04W 36/06* (2013.01); *H04W 72/12* (2013.01); *H04W 76/048* (2013.01); *H04W 88/06* (2013.01); *H04W 68/02* (2013.01); *H04W 72/1215* (2013.01)

(58) Field of Classification Search
USPC ............. 370/328–339; 455/425, 550.1–552.1
See application file for complete search history.

(56) References Cited

U.S. PATENT DOCUMENTS 6,959,201 B2  10/2005  Leprieur et al.
7,986,661 B2  7/2011  Bhattacharjee et al.
(Continued)

FOREIGN PATENT DOCUMENTS

WO    2007036962 A1    4/2007

OTHER PUBLICATIONS

ERICSSON, "Dual-SIM Dual-Standby UEs and their impact on the RAN", 3GPP Draft; R2-115375 Dual-SIM Dual-Standby UEs and Their Impact on the RAN, 3rd Generation Partnership Project (3GPP), Mobile Competence Centre ; 650, Route Des Lucioles ; F-06921 Sophia-Antipolis Cedex ; France, vol. RAN WG2, No. Zhuhai; Oct. 10, 2011, Oct. 3, 2011, XP050540879, [retrieved on Oct. 3, 2011].

(Continued)

*Primary Examiner* — Frank Duong
(74) *Attorney, Agent, or Firm* — QUALCOMM IP Department; James Hunt Yancey, Jr.

(57) ABSTRACT

Apparatus and methods are disclosed to provide for a multi-SIM wireless user equipment configured for block-level, or slot-level tune-away operations enabling simultaneous communication with a plurality of channels. The first and second channels may correspond to different RANs, each of which the user equipment may subscribe to as corresponding to information in a plurality of SIMs at the user equipment. In other examples, the first and second channels may correspond to different cells within a single RAN. In either case, the tune-away operations disclosed provide for reduced data loss at the first channel and in some examples improved communication performance at the second channel. Other aspects, embodiments, and features are also claimed and described.

18 Claims, 9 Drawing Sheets

(51) Int. Cl.
*H04W 72/12* (2009.01)
*H04W 76/04* (2009.01)
*H04W 88/06* (2009.01)
*H04W 68/02* (2009.01)

(56) References Cited

U.S. PATENT DOCUMENTS

| | | |
|---|---|---|
| 8,060,133 B1 | 11/2011 | Khanka et al. |
| 8,094,554 B2 | 1/2012 | Gholmieh et al. |
| 8,238,321 B2 | 8/2012 | Joshi et al. |
| 8,290,460 B2 | 10/2012 | Hoepfner |
| 8,472,999 B2 * | 6/2013 | Zhang ................ 455/552.1 |
| 8,526,946 B2 | 9/2013 | Pattaswamy et al. |
| 8,774,811 B2 | 7/2014 | Chou et al. |
| 2007/0072643 A1 | 3/2007 | Jiang et al. |
| 2008/0274742 A1 | 11/2008 | Bi |
| 2009/0046637 A1 | 2/2009 | Kim et al. |
| 2009/0131054 A1 | 5/2009 | Zhang |
| 2009/0279517 A1 | 11/2009 | Chin et al. |
| 2011/0077003 A1 | 3/2011 | Shin |
| 2011/0130086 A1 | 6/2011 | Sinnarajah et al. |
| 2011/0217969 A1 | 9/2011 | Spartz et al. |
| 2012/0021755 A1 | 1/2012 | Chin et al. |
| 2012/0027003 A1 | 2/2012 | Chin et al. |
| 2012/0028657 A1 | 2/2012 | Chin et al. |
| 2012/0039261 A1 | 2/2012 | Chin et al. |
| 2012/0040672 A1 | 2/2012 | Chin et al. |
| 2012/0051285 A1 | 3/2012 | Hou |
| 2012/0057525 A1 * | 3/2012 | Hou ............................ 370/328 |
| 2012/0058748 A1 | 3/2012 | Jeung et al. |
| 2012/0088501 A1 | 4/2012 | Chin et al. |
| 2012/0088502 A1 | 4/2012 | Chin et al. |
| 2012/0135715 A1 | 5/2012 | Kang et al. |
| 2012/0149361 A1 | 6/2012 | Esch et al. |
| 2012/0190362 A1 | 7/2012 | Subbarayudu et al. |
| 2012/0231802 A1 | 9/2012 | Ngai |
| 2012/0294291 A1 | 11/2012 | Su et al. |
| 2013/0065644 A1 | 3/2013 | Bishop et al. |
| 2013/0210484 A1 * | 8/2013 | Jeenagala et al. .......... 455/552.1 |
| 2013/0303139 A1 * | 11/2013 | Helfre et al. .................. 455/417 |
| 2013/0337861 A1 * | 12/2013 | Bhogaraju et al. ........... 455/522 |
| 2014/0119293 A1 | 5/2014 | Sikri et al. |
| 2014/0120925 A1 | 5/2014 | Kanthala et al. |

OTHER PUBLICATIONS

International Search Report and Written Opinion—PCT/US2013/068111—ISA/EPO—Feb. 17, 2014.
Non-Final Office Action; United States Patent and Trademark Office; Oct. 2, 2014, U.S. Appl. No. 13/758,719, filed Feb. 4, 2013.

* cited by examiner

FIG. 4
Block-Level Tune-Away

FIG. 5

FIG. 6
Slot-Level Tune-Away

FIG. 7

FIG. 8
Slot-Level Tune-Away

FIG. 9

APPARATUS AND METHOD FOR EMPLOYING A TUNE-AWAY OPERATION TO COMMUNICATE SIMULTANEOUSLY WITH A PLURALITY OF CHANNELS

CROSS-REFERENCE TO RELATED APPLICATIONS

This application claims priority to and the benefit of U.S. Provisional Patent Application No. 61/721,118, filed in the United States Patent and Trademark Office on Nov. 1, 2012, the entire content of which is incorporated herein by reference as if fully set forth below and for all applicable purposes.

TECHNICAL FIELD

The technology discussed in this patent application relates generally to wireless communication systems, and more particularly, to simultaneous communication with a plurality of channels. Varying embodiments can be used with any number of communication protocols and technologies.

BACKGROUND

Wireless communication networks are widely deployed to provide various communication services such as telephony, video, data, messaging, broadcasts, and so on. Such networks, which are usually multiple access networks, support communications for multiple users by sharing the available network resources.

One example of a communication network is a global system for mobile (GSM) network. GSM utilizes a GSM air interface. Enhanced GPRS is an extension of GSM technology providing increased data rates beyond those available in second-generation GSM technology. EGPRS is also known in the field as Enhanced Data rates for GSM Evolution (EDGE), and IMT Single Carrier.

Generally, wireless mobile equipment (called user equipment or UE in 3GPP terminology such as GSM, but also called access terminal, mobile station, etc. in various literature) configured for EGPRS uses a SIM card (subscriber identity module) to store the subscriber's identity and for other security and authentication purposes. More recently, some UEs have a dual SIM capability, such that the user of the device can engage in calls on two different subscriptions. These two subscriptions might be on the same network or on different networks. Some such dual-SIM mobile devices only utilize a single receiver and transmitter that are shared by both subscriptions.

As demand for mobile access continues to increase, research and development continue to advance wireless technologies not only to meet the growing demand for mobile broadband access, but to advance and enhance user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a block-level tune away procedure for temporarily tuning from a first channel to a second channel to perform a communication activity at the second channel, before returning to the first channel to continue an ongoing communication activity at that channel.

Another aspect of the disclosure provides a slot-level tune-away procedure similar to the block-level tune-away procedure, but utilizing a shorter duration of tune-away, i.e., having a duration extending less than a full data frame. In this way, data losses at the first channel can be reduced or eliminated, while reliability and performance of communication with the second channel can also be improved.

For example, in one aspect, the disclosure provides a method of wireless communication operable at a user equipment (UE), including the steps of utilizing a transceiver to perform a first wireless communication activity corresponding to a first channel, autonomously tuning the transceiver from the first channel to a second channel during a first frame, performing a second wireless communication activity corresponding to the second channel, and tuning the transceiver from the second channel to the first channel during the first frame.

In another aspect, the disclosure provides a wireless communication device, including at least one processor, a memory communicatively coupled to the at least one processor, and a transceiver communicatively coupled to the at least one processor. Here, the at least one processor is configured to utilize the transceiver to perform a first wireless communication activity corresponding to a first channel, to autonomously tune the transceiver away from the first channel to a second channel during a first frame, to utilize the transceiver to perform a second wireless communication activity corresponding to the second channel; and to tune the transceiver from the second channel to the first channel during the first frame.

In another aspect, the disclosure provides a wireless communication device, including means for storing a first subscriber identity corresponding to a first channel, means for storing a second subscriber identity corresponding to a second channel, and means for performing a first wireless communication activity corresponding to the first channel, wherein the means for performing the first wireless communication activity is further configured to autonomously tune from the first channel to the second channel during a first frame, to perform a second wireless communication activity corresponding to the second channel, and to tune from the second channel to the first channel during the first frame.

In another aspect, the disclosure provides a computer-readable storage medium having instructions for causing a computer to utilize a transceiver to perform a first wireless communication activity corresponding to a first channel, autonomously tune the transceiver away from the first channel to a second channel during a first frame, to utilize the transceiver to perform a second wireless communication activity corresponding to the second channel, and to tune the transceiver from the second channel to the first channel during the first frame.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

One or more aspects of the disclosure provide for multi-SIM wireless user equipment (UE) configured to enable communication with two or more subscriptions. Subscriptions may be in the same or in different radio access technologies (RAT). Specific examples are provided below with reference to an enhanced general packet radio service (EGPRS) system. However, the concepts disclosed can be applied to any time-division-based system, such as but not limited to a UMTS system using a TD-SCDMA air interface, or an e-UTRA system using a TD-LTE air interface. Especially in the dual-SIM examples, the two subscriptions might be on any two of these types of systems.

Figure 1:
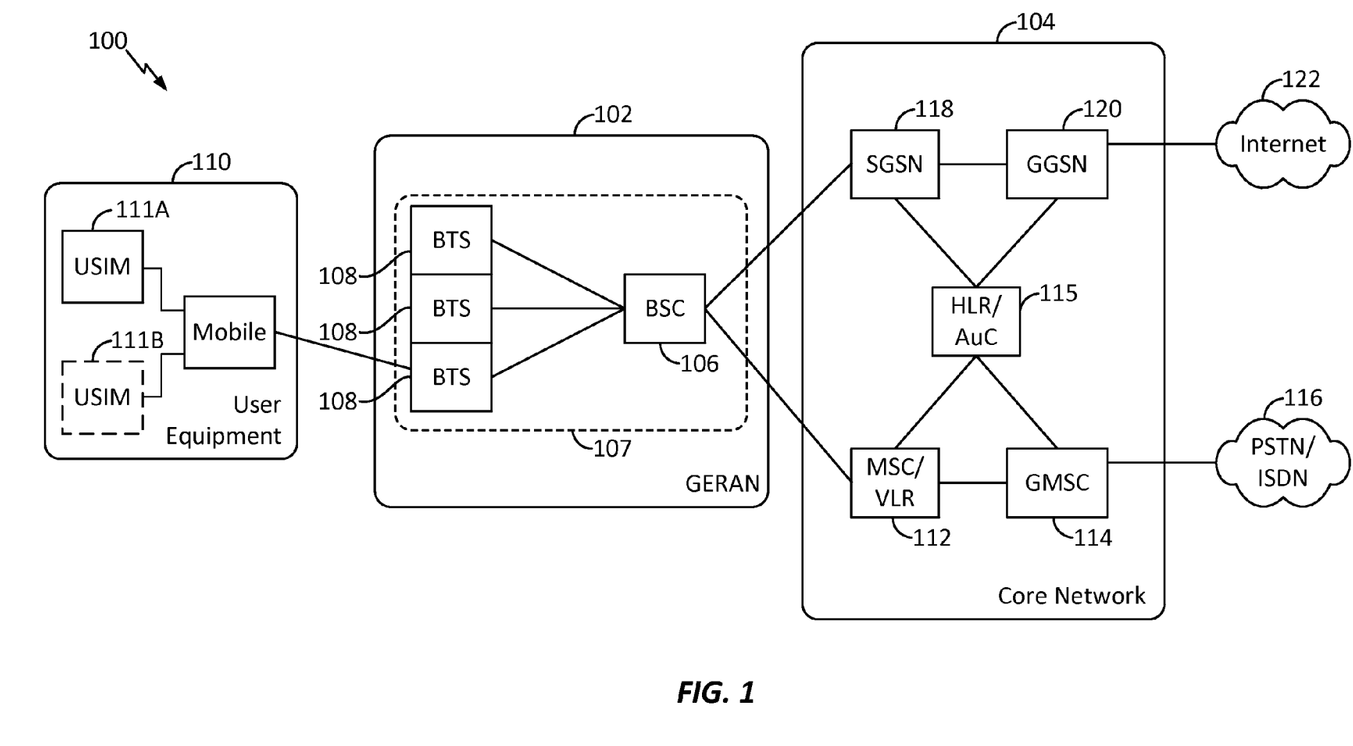
FIG. 1 is a block diagram conceptually illustrating an example of a telecommunications system according to some embodiments.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a global system for mobile (GSM) system 100. A GSM network includes three interacting domains: a core network 104, a radio access network (RAN) (e.g., the GSM/EDGE Radio Access Network (GERAN) 102), and user equipment (UE) 110. In this example, the illustrated GERAN 102 may employ a GSM air interface for enabling various wireless services including telephony, video, data, messaging, broadcasts, and/or other services. The GERAN 102 may include a plurality of Radio Network Subsystems (RNSs) such as an RNS 107, each controlled by a respective Base Station Controller (BSC) such as a BSC 106. Here, the GERAN 102 may include any number of BSCs 106 and RNSs 107 in addition to the illustrated BSCs 106 and RNSs 107. The BSC 106 is an apparatus responsible for, among other things, assigning, reconfiguring, and releasing radio resources within the RNS 107.

The geographic region covered by the RNS 107 may be divided into a number of cells, with a radio transceiver apparatus serving each cell. A radio transceiver apparatus is commonly referred to as a base transceiver station (BTS) in GSM applications, but may also be referred to by those skilled in the art as a base station (BS), a Node B, a radio base station, a radio transceiver, a transceiver function, a basic service set (BSS), an extended service set (ESS), an access point (AP), or some other suitable terminology. For clarity, three BTSs 108 are shown in the illustrated RNS 107; however, the RNSs 107 may include any number of wireless BTSs 108. The BTSs 108 provide wireless access points to a GPRS core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a television, an entertainment device, a computing device, an electronic device, a communications device, or any other similar functioning device. The mobile apparatus is commonly referred to as user equipment (UE) in GSM applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

The GSM "Um" air interface generally utilizes GMSK modulation (although later enhancements such as EGPRS, described below, may utilize other modulation such as 8PSK), combining frequency hopping spread spectrum transmissions with time division multiple access (TDMA), which divides a frame into 8 time slots. Further, frequency division duplexing (FDD) divides uplink and downlink transmissions using a different carrier frequency for the uplink than that used for the downlink. Those skilled in the art will recognize that although various examples described herein may refer to GSM Um air interface, the underlying principles are equally applicable to any other suitable air interface.

In some aspects of the disclosure, the GSM system 100 may be further configured for enhanced GPRS (EGPRS). EGPRS is an extension of GSM technology providing increased data rates beyond those available in 2G GSM technology. EGPRS is also known in the field as Enhanced Data rates for GSM Evolution (EDGE), and IMT Single Carrier.

In EGPRS, when a physical connection is established between the UE 110 and a BTS 108, this connection is referred to as a temporary block flow (TBF), and the GERAN is said to operate in an EGPRS TBF mode. In general, a TBF is allocated radio resources on one or more physical data channels (PDCHs), and includes a number of RLC/MAC blocks that carry one or more LLC protocol data units (PDUs). TBFs are temporary, and are maintained only for the duration of the data transfer.

Specific examples are provided below with reference to the EGPRS system. However, the concepts disclosed in various aspects of the disclosure can be applied to any time-division-based system, such as but not limited to a UMTS system using a TD-SCDMA air interface, or an e-UTRA system using a TD-LTE air interface. Especially in the multi-SIM examples (described in further detail below), the multiple subscriptions might be on any one or more of these systems.

That is, in some aspects of the disclosure, the UE 110 may include a plurality of universal integrated circuit cards (UICC), each of which may run one or more universal subscriber identity module (USIM) applications 111. A USIM stores the subscriber's identity, and provides a user's subscription information to a network as well as performing other security and authentication roles. The illustrated UE 110 includes two USIMs 111A and 111B, but those of ordinary skill in the art will understand that this is illustrative in nature only, and a UE may include any suitable number of USIMs. UEs such as the UE 110 having multiple USIMs are sometimes referred to as multi-SIM/multiple standby devices, with one particular example including two USIMs being called dual SIM UE. A dual SIM UE is generally capable of being active on two networks simultaneously in standby mode, where a single transceiver at the UE 110 is shared by two subscriptions on the respective networks. In this way, connections or calls may be established on either of the networks or subscriptions with a single device.

For illustrative purposes, one UE 110 is shown in communication with one BTS 108. The downlink (DL), also called the forward link, refers to the communication link from a BTS 108 to a UE 110 and the uplink (UL), also called the reverse link, refers to the communication link from a UE 110 to a BTS 108.

The core network 104 can interface with one or more access networks, such as the GERAN 102. As shown, the core network 104 is a GSM core network. However, as those skilled in the art will recognize, the various concepts presented throughout this disclosure may be implemented in a RAN, or other suitable access network, to provide UEs with access to types of core networks other than GSM networks.

The illustrated GSM core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with a MSC 112 and a GMSC 114. In some applications, the GMSC 114 may be referred to as a media gateway (MGW). One or more BSCs, such as the BSC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the GERAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

As described above, the illustrated UE 110 shows a dual SIM UE capable of maintaining two subscriptions on the GSM network. 100. Within the scope of the present disclosure, similar functionality may be achieved utilizing more than one radio access technology (RAT), wherein the UE simultaneously maintains two or more subscriptions on two or more different RATs. Here, such a UE may maintain one or more subscriptions on one or more of a GSM network, a UMTS network, an LTE network, a cdma2000 network, a Wi-MAX network, or any other suitable RAT. Within the present disclosure, dual SIM UEs, multi-SIM/multiple standby devices, or any device capable of monitoring channels on two or more subscriptions on any one or any plural number of RATs is generally referred to as a multiple standby device.

On a multiple standby UE 110, compromises are typical to allow sharing of the radio transceiver between two or more separate user subscriptions. That is, the UE 110 generally cannot be guaranteed to be listening to all of the required radio channels for each subscription at the same time, and thus, may miss paging messages on one subscription when engaged in a communication activity utilizing the other subscription. Most cellular network implementations do allow for broadcast information (such as paging) to be repeated a finite number of times over multiple cycles, but do not provide any mechanism for the subscriber devices to know what this repetition pattern might be. Thus, there remains a possibility that such broadcast information might be missed by a UE engaged in a communication activity utilizing a different subscription or channel.

Figure 2:
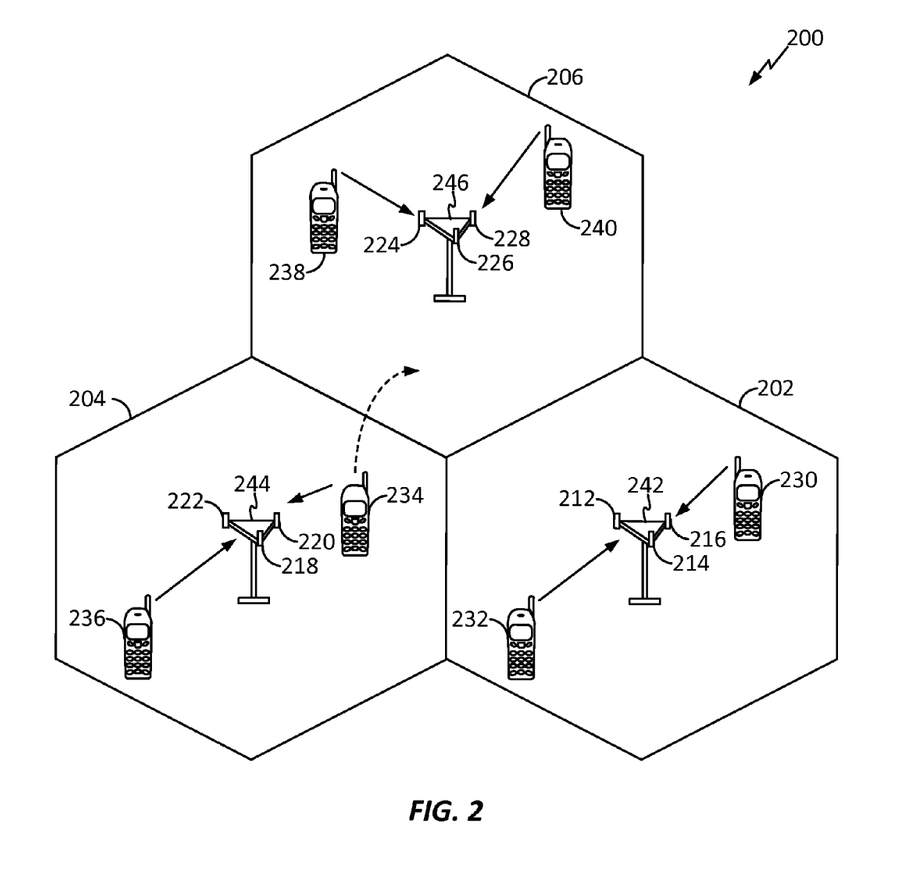
FIG. 2 is a conceptual diagram illustrating an example of an access network according to some embodiments.

The GERAN 102 is one example of a RAN that may be utilized in accordance with the present disclosure. Referring to FIG. 2, by way of example and without limitation, a simplified schematic illustration of a RAN 200 in a GERAN architecture is illustrated. The system includes multiple cellular regions (cells), including cells 202, 204, and 206, each of which may include one or more sectors. Cells may be defined geographically, e.g., by coverage area. In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with BTS 242, UEs 234 and 236 may be in communication with BTS 244, and UEs 238 and 240 may be in communication with BTS 246. Here, each BTS 242, 244, and 246 may be configured to provide an access point to a core network 104 (see FIG. 1) for all the UEs 230, 232, 234, 236, 238, and 240 in the respective cells 202, 204, and 206.

During a call with a source cell, or at any other time, the UE 236 may monitor various parameters of the source cell as well as various parameters of neighboring cells. Further, depending on the quality of these parameters, the UE 236 may maintain communication with one or more of the neighboring cells. During this time, the UE 236 may maintain an Active Set, that is, a list of cells to which the UE 236 is simultaneously connected (i.e., the GERAN cells that are currently assigning a downlink dedicated physical channel DPCH or fractional downlink dedicated physical channel F-DPCH to the UE 236 may constitute the Active Set).

Figure 3:
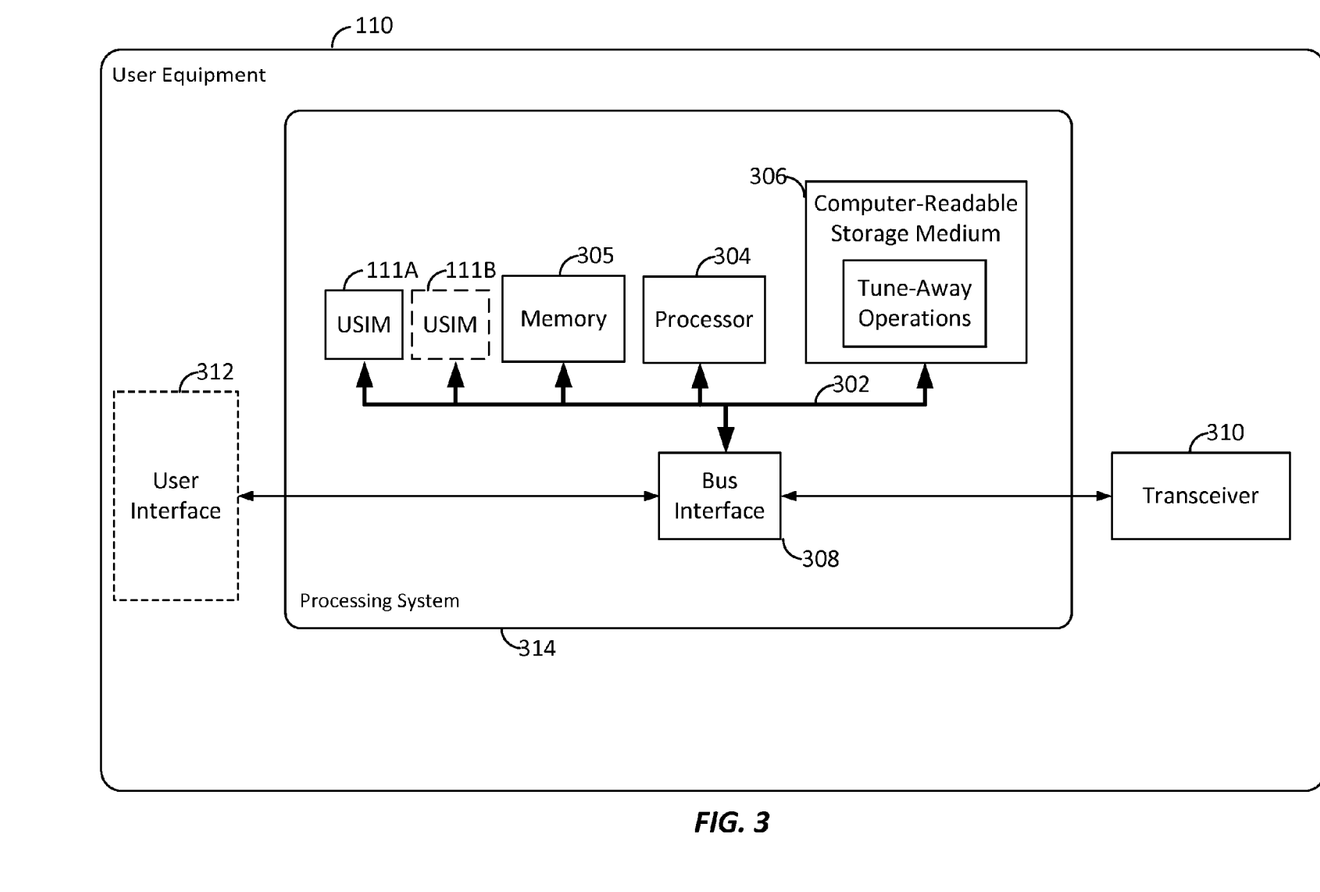
FIG. 3 is a block diagram illustrating an example of a hardware implementation for a user equipment employing a processing system according to some embodiments.

FIG. 3 is a block diagram illustrating an example of a hardware implementation for an apparatus (e.g., the UE 110) employing a processing system 314. In accordance with various aspects of the disclosure, an element, or any portion of an element, or any combination of elements may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors (represented generally by the processor 304), a memory 305, computer-readable media (represented generally by the computer-readable medium 306), and one or more USIMs (e.g., dual USIMs 111A and 111B). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium.

In some examples of a multi-SIM device such as the illustrated UE 110 including two USIMs 111, even though each USIM may be utilized by different subscriptions or networks, the subscriptions may share a single transceiver 310. However, while the examples detailed herein relate to UEs that utilize a single transceiver 310, and methods for performing the below-described tune-aways utilizing that single transceiver, the broad concepts described herein may also be applicable to devices having two or more transceivers 310.

Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described infra for any particular apparatus. The computer-readable medium 306 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

It may be the case that the UE 110 wishes simultaneously to perform multiple different communication activities. These activities may include, but are not limited to, connecting with two different networks, or two different subscriptions within the same network, or two cells in a cellular network. Particularly beneficial would be a UE 110 enabled to continue to be engaged in one of these ongoing communication activities, while simultaneously performing another communication activity, such as receiving page messages, performing SMS messaging, data transmissions, or receiving other information on a different subscription or from a different cell. Generally a communication activity occurs when a UE communicates with a network, such as, for example a voice call, data call, or exchanging operating parameter information with a network. Other types of communication activities are also possible.

When a conventional GPRS- or EGPRS-compatible UE is undergoing cell reselection, the TBF corresponding to its serving cell may be temporarily suspended, in order for the UE to receive information on the BCCH from the target cell.

This TBF suspension mode, which operates at the granularity of RLC blocks, enables the UE to perform a second activity while engaged in a first data transfer activity. However, the TBF suspension mode can lead to a relatively large degradation in (E)GPRS data transfer throughputs.

Embodiments of the present invention enable a reduction of this degradation. For example, embodiments enable and provide for block-level tune-aways during data transfer for a dual-SIM operative mode. In addition, embodiments enable and provide for both block-level and slot-level (or burst-level) tune-aways during data transfer for both single-SIM and dual-SIM operative modes, described in further detail below. Here, a tune-away refers to a change or reconfiguration of a transceiver to operate in a different band or frequency channel, or in some examples, to change a modulation scheme to operate in a different CDMA channel. With such tune-aways, the UE 110 is enabled, for example, to decode a BCCH from a neighbor cell, to perform or page reads for a second subscription corresponding to a second USIM, etc., using a single transceiver 310 and limiting the negative impact to throughput that otherwise may result from TBF suspension.

That is, in one or more aspects of the disclosure the UE 110 may be adapted to be enabled to perform two different activities simultaneously. For example, this can occur by temporarily tuning away from one activity to perform the other, before returning (tuning back) to the first activity. Aspects of the disclosure disclose a more optimal and efficient tuning away, such that the first activity, from which the UE 110 tunes away, is not substantially compromised. The UE 110 can be configured such that a transceiver can tune between multiple networks. The tuning between networks can be done autonomously as discussed herein and also done in other fashions as desired.

One advantage of some of the tune-away features and procedures disclosed herein lies in how it enables the UE 110 to use a single transceiver 310 to communicate with two cells or subscriptions in an efficient way, providing a low-cost solution with a relatively small compromise in performance.

To provide a straightforward understanding of various aspects of the disclosure, two examples are provided below: a block-level tune-away and a burst-level tune-away. For each of these examples, it may be assumed that one subscription is in a data transfer mode (referred to as the transfer subscription or transfer sub), and another subscription is in an idle mode (referred to as the idle subscription or idle sub). As described below, during the data transfer, the UE may periodically tune away and perform the idle activity with the same transceiver. While the examples are discussed with reference to tuning between two networks, additional embodiments of the present invention can include tuning between more networks.

Block-Level Tune-Away

In various aspects of the disclosure, wireless communication activity corresponding to one channel or subscription may be suspended for a certain period of time. During this time, the resources (transceiver hardware, as well as firmware and software) at the UE 110 may be completely given over to a second wireless communication activity. After the second wireless communication activity, which may be a short duration activity, is completed, the UE 110 may return to the first wireless communication activity, as illustrated in FIG. 4.

Figure 4:
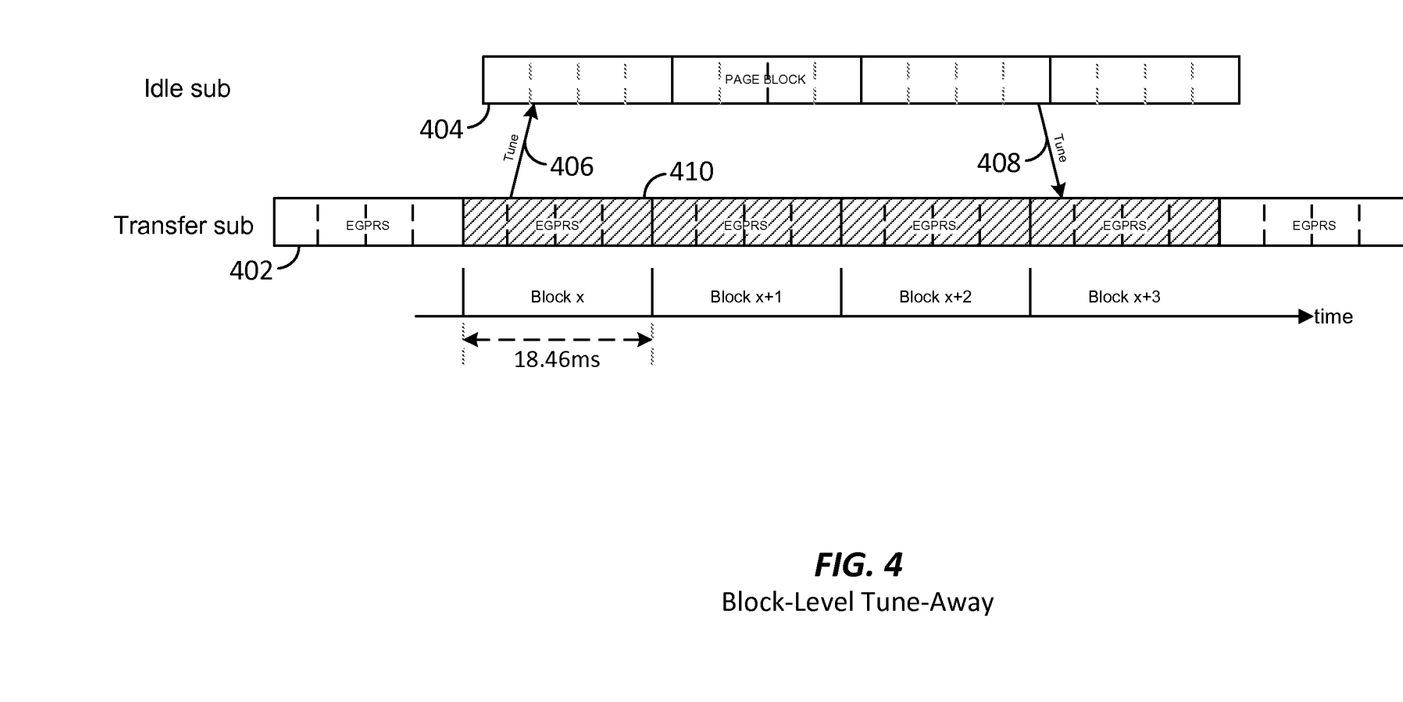
FIG. 4 is a schematic timing diagram illustrating a block-level tune-away operation in accordance with some embodiments.

That is, FIG. 4 is a schematic timing diagram illustrating a block-level tune-away operation corresponding to one or more aspects of the disclosure. In the illustrated example, the line labeled "transfer sub" 402 refers to an open communication channel, which may correspond to a first subscription utilizing information from a first USIM 111A. Here, the UE 110 may be utilizing this first subscription for a wireless communication activity such as a data transfer during the time of the illustration. The first subscription may correspond to any suitable wireless communication system such as, but not limited to, the EGPRS system described above. Here, the illustration of the transfer sub 402 shows a span of six radio blocks, each block having a duration of about 18.46 ms in an EGPRS system.

As illustrated, at 406 the transceiver 310 at the UE 110 may autonomously tune away from the transfer sub 402 for a series of blocks, such that the resources can completely be dedicated to an idle sub 404 to listen for information such as page messages. Here, by autonomously tuning away from the transfer sub 402, the UE 110 need not communicate any information about the tune-away operation to the base station 108, to the access network 102, to the core network 104, or to any other entity. That is, unlike conventional re-tuning operations such as those that might occur in a UMTS compressed mode or other operations wherein timing or other corresponding information for the tune-away operation is coordinated with the network, in an aspect of the disclosure, the autonomous tune-away 406 may be autonomously and/or independently determined and operated at the UE 110. In this way, even though the UE 110 has tuned away from the transfer sub 402, the network corresponding to the transfer sub 402 may continue transmissions to the UE 110, e.g., fully expecting that the UE 110 remains tuned to the transfer sub 402. Thus, the UE 110 may lose some data transmitted on the transfer sub 402 during the time it is tuned away from the transfer sub 402. However, by virtue of mechanisms such as forward error correction and/or retransmissions, the impact of the loss of data during the tune-away operation can be reduced or eliminated. In some examples wherein a retransmission mechanism is utilized, when a UE 110 implements such an autonomous tune-away operation and misses some forward link transmissions, the network may recognize that the UE 110 did not acknowledge one or more packets and may accordingly retransmit those packets.

Here, the line labeled "idle sub" 404 refers to a second communication channel, which may correspond to a second subscription utilizing information from a second USIM 111B. Here, the UE 110 may be tuning to this second subscription to perform certain idle mode activities, which may include one or more of reading/decoding the paging channel PCH and/or the broadcast control channel BCCH, reconfirming a shared channel SCH, and/or performing SMS messaging, etc. Of course, any suitable activity utilizing the second subscription may take place while tuned on the idle sub 404. After a suitable amount of time, or after the idle sub 404 activity is complete, at 408 the transceiver 310 at the UE 110 may tune back to the transfer sub 402, continuing the data transfer that was ongoing there.

In this example, the tune-away lasts for a duration of four radio blocks. Of course, this 4-block tune-away duration is merely one example, and any suitable duration including one or more blocks may be utilized in various other examples. During the time of the tune-away from the transfer sub 402, some of the data transferred between the UE 110 and the BTS 108 on the transfer sub 402 is lost, represented in FIG. 4 by the diagonal crossing pattern in the missed blocks 410. Thus, with the block-level tune-away example described herein above, there is some compromise or trade-off between data throughput on the transfer sub 402 and paging reception performance on the idle sub 402.

Figure 5:
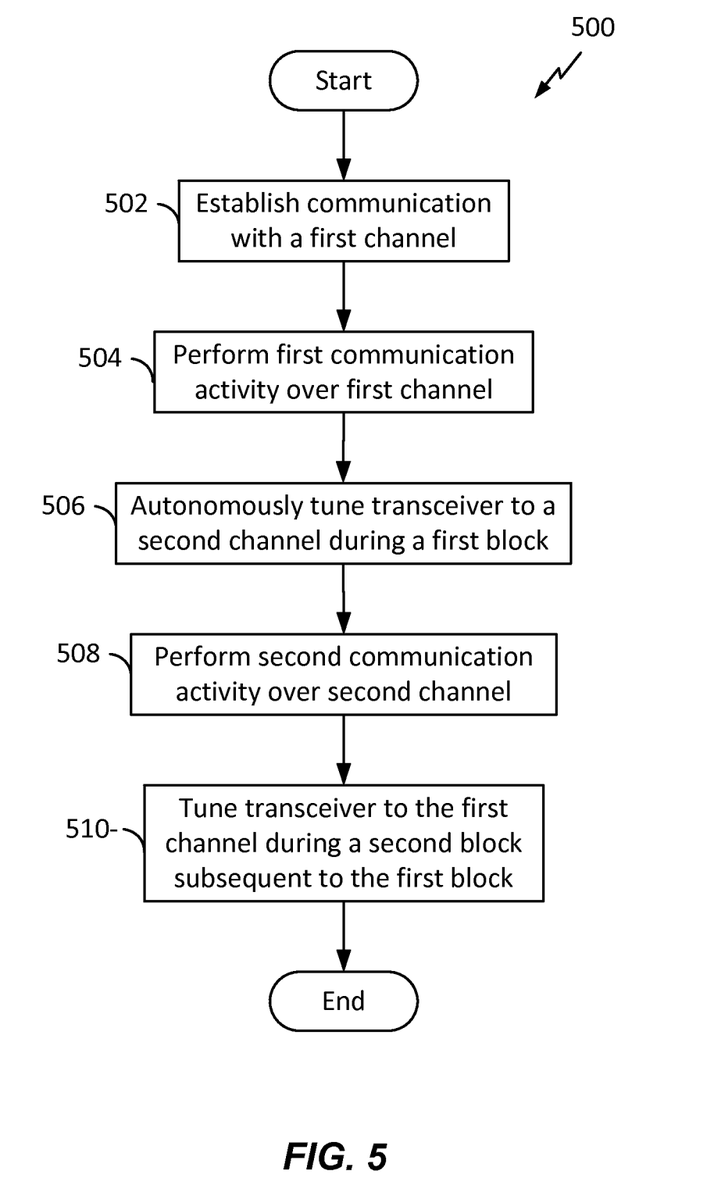
FIG. 5 is a flow chart illustrating the block-level tune-away operation of FIG. 4 in accordance with some embodiments.

FIG. 5 is a flow chart illustrating an exemplary process 500 operable at a UE 110 for implementing a block-level tune-away operation in accordance with an aspect of the disclosure. As described herein, the tune-away operation described in the process 500 may be performed independently at the UE 110, without necessitating signaling or other communication with any other node in the communication network informing the network that the tune-away operation is to take place. That is, the network corresponding to the transfer sub 402 may continue transmitting and/or expecting to receive information while the UE 110 is tuned away, yet because the transceiver 310 at the UE 110 is not tuned to the transfer sub 402 at this time, such data will generally be lost. However, conventional error handling procedures can enable such data loss to be minimized.

At step 502 the UE 110 may establish communication with a first channel. For example, a physical radio connection may be established with a radio access network, such as the GERAN 102. At step 504, the UE 110 may perform a first communication activity over this first channel, for example, including any suitable voice and/or data call. Here, the call established at step 502 may utilize subscription information stored at a first USIM 111A.

At step 506, the transceiver 310 at the UE 110 may autonomously tune to a second channel during a first block; and at step 508, the UE 110 may perform a second communication activity over the second channel. Here, the second channel may include any suitable access network, including the same GERAN 102 as the first channel; a second GERAN corresponding to a different network operator; or another RAN technology, including but not limited to a UTRAN, an e-UTRAN, a cdma2000 network, etc. Further, as described above, the second communication activity may include any suitable activity that the UE 110 may wish to undertake as it is tuned to the second channel, including but not limited to decoding a page message, decoding broadcast information, performing SMS messaging, etc.

At step 510, the transceiver 310 at the UE 110 may tune to the first channel during a second block, subsequent to the first block. The timing of the tuning back to the first channel described at step 510 may be determined at the UE 110, and may correspond to the completion of the second communication activity at the second channel, or may be predetermined at the UE 110 based on any suitable factors, such as a maximum desired tune-away time, a maximum data loss at the transfer sub 602, etc.

Slot-Level (or Burst) Tune-Away

Figure 6:
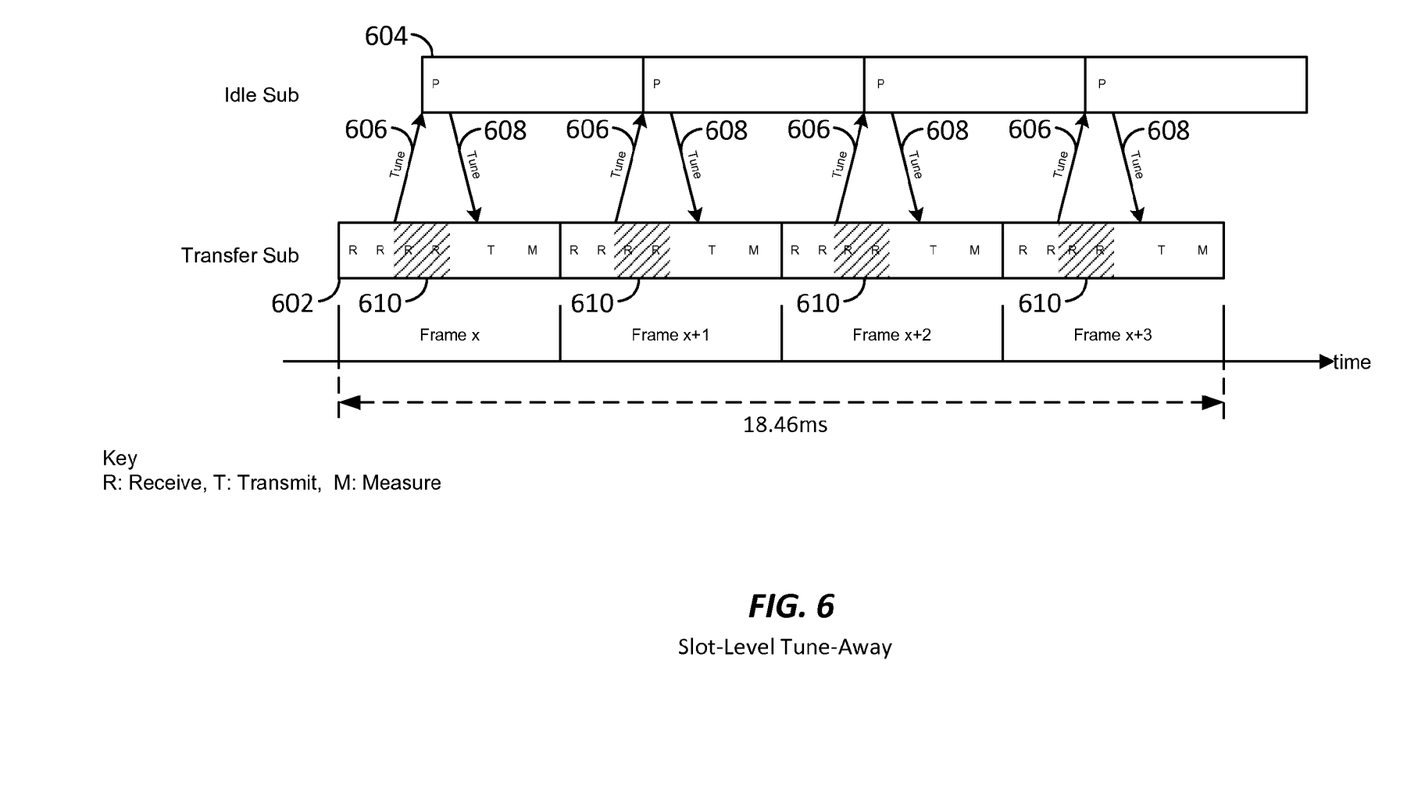
FIG. 6 is a schematic timing diagram illustrating an example of a slot-level tune-away operation in accordance with some embodiments.

Another aspect of the disclosure may assist to reduce the data loss on the transfer sub, which may occur utilizing the block-level tune-away described above. For example, FIG. 6 is a schematic timing diagram illustrating a slot-level tune-away operation corresponding to one or more aspects of the disclosure. As mentioned above, this scheme may apply either to a dual-SIM or a single-SIM UE 110. First, a dual-SIM example is described for clarity.

In FIG. 6, it can be seen that a single 18.46 ms block is illustrated, including four frames designated as frame X to frame X+3. That is, unlike the illustration of FIG. 4, which spanned six blocks, FIG. 6 shows a shorter span that only includes a single block. Within each frame are included a plurality of time slots. For example, each GERAN frame may include 8 slots. Here, some of these time slots are designated for transmission by the UE 110, designated in the illustration with a "T"; some of these time slots are designated for reception by the UE 110, designated in the illustration with an "R"; and some of these time slots are designated for measurement of various characteristics of the air channel, designated in the illustration with an "M."

Similar to the above example of a block-level tune-away operation, in this first example of a slot-level tune-away operation the UE 110 is initially engaged in a communication activity such as a data transfer using a first subscription, which may be referred to as the transfer sub 602, which may utilize information from a first USIM 111A. This data transfer may be any of various types of data transfer, including a voice call or other packet-switched data session.

As illustrated, during this session, at 606 the transceiver 310 at the UE 110 may autonomously tune away from the transfer sub 602 to a second subscription for one or more slots within a frame, called an idle sub 604, to perform idle mode activities. As in the example described above for a block-level tune-away operation, here, in the slot-level tune-away, the line labeled "idle sub" 604 refers to a second communication channel, which may correspond to a second subscription utilizing information from a second USIM 111B.

In an aspect of the disclosure, the first example of a slot-level tune-away operation as illustrated in FIG. 6 may enable a very limited loss of data on the transfer sub, or in some scenarios, may enable zero loss on the transfer sub resulting from the tune-away operation. To this end, with a slot-level tune-away, rather than completely giving away the resources from the transfer sub to the idle sub, the resource sharing is accomplished at the burst or slot level (i.e., within a frame).

Recall that the block-level tune-away operation described above and illustrated in FIG. 4 tuned away from the transfer sub for a duration spanning several blocks, where each block lasts about 18.46 ms and includes four radio frames. However, in the first example of the slot-level tune-away operation illustrated in FIG. 6, the time scale is very different: the entire illustration only shows a single block, showing its four constituent frames; and the tune-away has a duration that spans mere slots within each frame.

In an aspect of the disclosure, the tune-away within a frame may be specifically timed such that the transceiver 310 may tune to the idle sub 604 when page information (designated in the illustration with a "P") is predicted to appear on the idle sub 604. Here, the page information may include one or more paging indicators carried on a quick paging channel or paging indicator channel, or in other examples, may include one or more page messages carried on a paging channel. Of course, page information is only one example of the information on the idle sub 604 that the UE 110 may tune away to detect; in other examples, the information on the idle sub 604 may be any suitable information that the UE 110 may wish to retrieve during the ongoing data session on the transfer sub 602, e.g., listening to broadcast messages, performing SMS messaging, etc.

Once the page information P has been decoded from the idle sub 604, at 608 the transceiver 310 may tune back to the transfer sub 602 to resume the previous activity until the next page period. P In the illustrated example, the transceiver 310 at the UE 110 tunes to the idle sub four times to retrieve four page bursts; however, in various examples, the transceiver 310 at the UE 110 may tune to the idle sub any suitable number of times, e.g., until the desired information sought is decoded on the idle sub.

With a slot-level tune-away operation as described herein, data losses on the transfer sub 602 resulting from the tune-away (represented in FIG. 6 by the slots 610 including the diagonal cross marks) can be reduced or eliminated depending on the timing of the activity on the transfer sub, and whether the tune-away operation overlaps with the timing of the activity on the idle sub. That is, as illustrated in FIG. 6, only in some of the slots in each frame does the UE 110 receive (R) or transmit (T) data bursts; other slots, which are blank in this illustration, are idle as far as this UE 110 is concerned. Thus, if the timing of the tune-away operation is coordinated with these unused slots, data loss at the transfer sub resulting from the tune-away operation can be reduced or eliminated.

Moreover, in a further aspect of the disclosure the performance of the receiving of the page messages on the idle sub 604 may also be improved with the slot-level tune-away operation described herein as compared to the block-level tune-away operation described above. That is, because tuning away to the idle sub 604 at the slot level is less costly to the transfer sub 602, such tune-aways can be performed more often, thereby ensuring more complete reception of the information on the idle sub 602.

Figure 7:
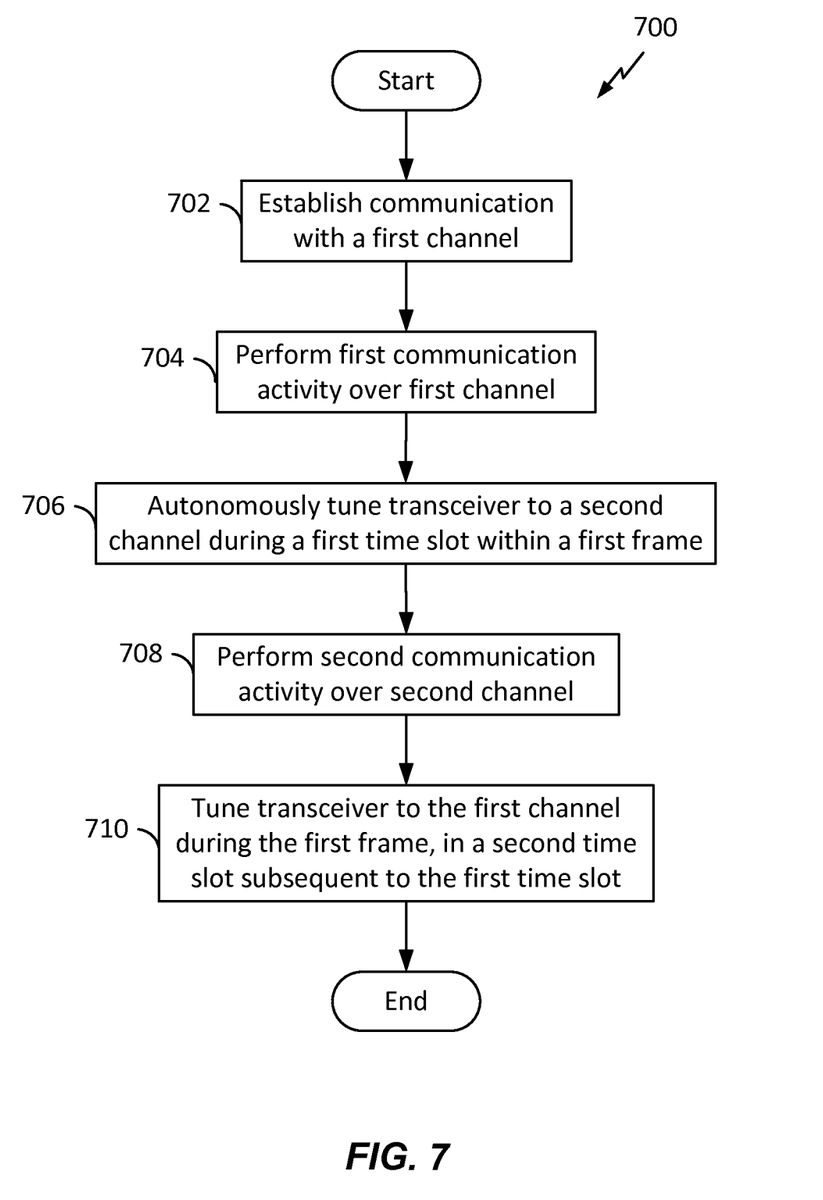
FIG. 7 is a flow chart illustrating the example of the slot-level tune-away operation of FIG. 6 in accordance with some embodiments.

FIG. 7 is a flow chart illustrating an exemplary process 700 operable at a UE 110 that includes two or more USIMs 111, for implementing a slot-level tune-away operation in accordance with an aspect of the disclosure. As described herein, the tune-away operation described in the process 700 may be performed independently at the UE 110, without necessitating signaling or other communication with any other node in the communication network informing the network that the tune-away operation is to take place. That is, the network corresponding to the transfer sub 602 may continue transmitting and/or expecting to receive information while the UE 110 is tuned away, yet because the transceiver 310 at the UE 110 is not tuned to the transfer sub 602 at this time, such data will generally be lost. However, conventional error handling procedures can enable such data loss to be minimized.

At step 702, the UE 110 may establish communication with a first channel. For example, a physical radio connection may be established with a radio access network, such as the GERAN 102. At step 704, the UE 110 may perform a first communication activity over this first channel, for example, including any suitable voice and/or data call. Here, the call established at step 702 may utilize subscription information stored at a first USIM 111A.

At step 706, the transceiver 310 at the UE 110 may autonomously tune to a second channel during a first time slot within a first frame; and at step 708, the UE 110 may perform a second communication activity over the second channel. Here, the second channel may include any suitable access network, including the same GERAN 102 as the first channel; a second GERAN corresponding to a different network operator; or another RAN technology, including but not limited to a UTRAN, an e-UTRAN, a cdma2000 network, etc. Further, as described above, the second communication activity may include any suitable activity that the UE 110 may wish to undertake as it is tuned to the second channel, including but not limited to decoding a page message, decoding broadcast information, performing SMS messaging, etc.

At step 710, the transceiver 310 at the UE 110 may tune to the first channel during the first frame, in a time slot subsequent to the first time slot. The timing of the tuning back to the first channel described at step 510 may be determined at the UE 110, and may correspond to the completion of the second communication activity at the second channel, or may be predetermined at the UE 110 based on any suitable factors, such as a maximum desired tune-away time, a maximum data loss at the transfer sub 602, known timing of transmit and/or receive activity at the transfer sub 602 etc.

Single-SIM

In another aspect of the disclosure, a single-SIM UE 110 may implement a slot-level tune-away operation in much the same way as the first example of the slot-level tune-away operation described above in relation to a dual-SIM UE 110. Of course, a dual-SIM UE 110 may equivalently utilize the second example of the slot-level tune-away operation as described herein below, as may any UE 110 including any number of USIMs.

That is, the above dual-SIM examples for both block-level and slot-level tune-away operations referred to tuning between different subscriptions, each subscription corresponding to a different SIM in the UE 110. On the other hand, as described below, a slot-level tune-away operation may additionally be utilized by either single-SIM or dual-SIM UEs 110 for other purposes.

For example, to provide for mobility, any UE 110 in a wireless network 100 (including either single-SIM or dual-SIM UEs) generally monitors broadcast information from its serving cell and/or from neighboring cells (i.e., cells that are near to the UE 110, other than its current serving cell). Thus, in accordance with an aspect of the disclosure, a UE 110 in communication with one channel (e.g., a data channel from its a serving cell) may wish to tune away from that channel to decode transmissions from another channel (e.g., transmitted by the serving cell or by a neighbor cell).

Figure 8:
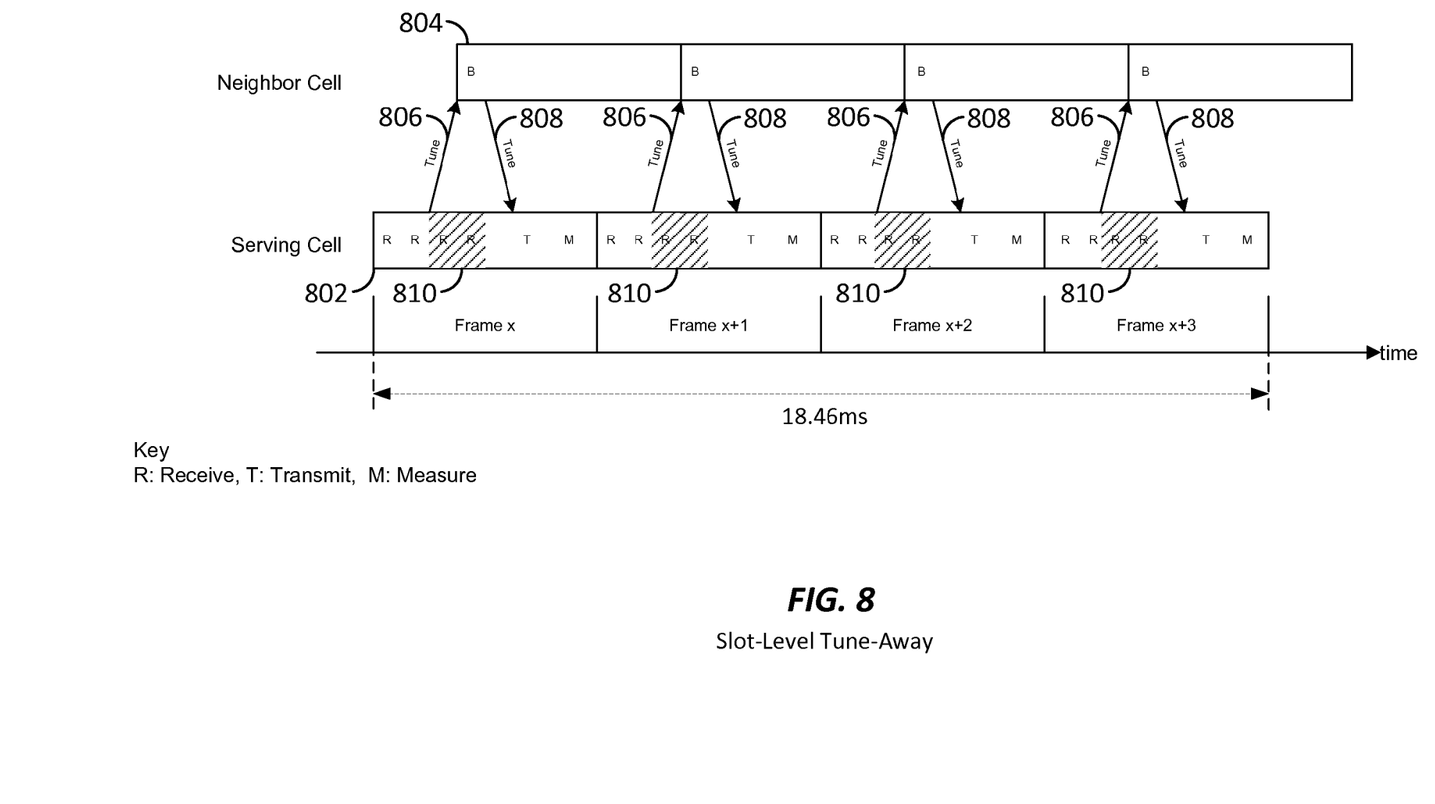
FIG. 8 is a schematic timing diagram illustrating another example of a slot-level tune away operation in accordance with some embodiments.

FIG. 8 is a schematic timing diagram illustrating a second example of a slot-level tune-away operation that may be utilized by single-SIM or dual-SIM UEs 110 in accordance with an aspect of the disclosure. Comparing FIGS. 6 and 8, it can be seen that the tune-away operation is similar; although in FIG. 8, rather than referring to two different subscriptions, which might be on the same RAN or on different RANs, here, reference is made to communication with two cells: a "serving cell" 802, which is serving the UE 110, and a "neighbor cell" 804, which may be in the proximity of the UE 110 at the illustrated time.

In some examples, the channel corresponding to the neighbor cell 804 in the illustration might utilize a different carrier frequency than the channel corresponding to the serving cell 802. Further, in some examples, the channel corresponding to the neighbor cell 804 may utilize different or un-aligned time slots compared to those utilized by the serving cell 802.

As illustrated, during a communication session with the serving cell, at 806 the transceiver 310 at the UE 110 may autonomously tune away from the serving cell 802 to a neighbor cell 804 for one or more slots within a frame, to perform any suitable activity, for example, for listening for broadcast messages (designated in the illustration as "B"). For example, the UE 110 may listen for broadcast information from the neighbor cell to be decoded by the transceiver 310, being carried on a broadcast control channel (BCCH) transmitted by the cell. Such broadcast information may include system information (SI), such as the SI 3 or SI 13 messages, which can be used for a cell reselection algorithm. In another example, the UE 110 may read all of the SI messages for a target cell (i.e., a cell to which the UE 110 will hand over from its serving cell) before leaving a packet transfer mode.

In this way, the reading of the neighbor cell SI messages from the neighbor cell 804 can be accomplished with little or no impact to data throughput on the serving cell 802. Thus, in a mobility scenario, data throughput to the serving cell can be improved. Moreover, prior-art TBF suspension can be eliminated when a UE 110 utilizing the burst tune-away as described herein reads SI messages, thereby reducing the degradation in throughput from the serving cell that may result therefrom.

Figure 9:
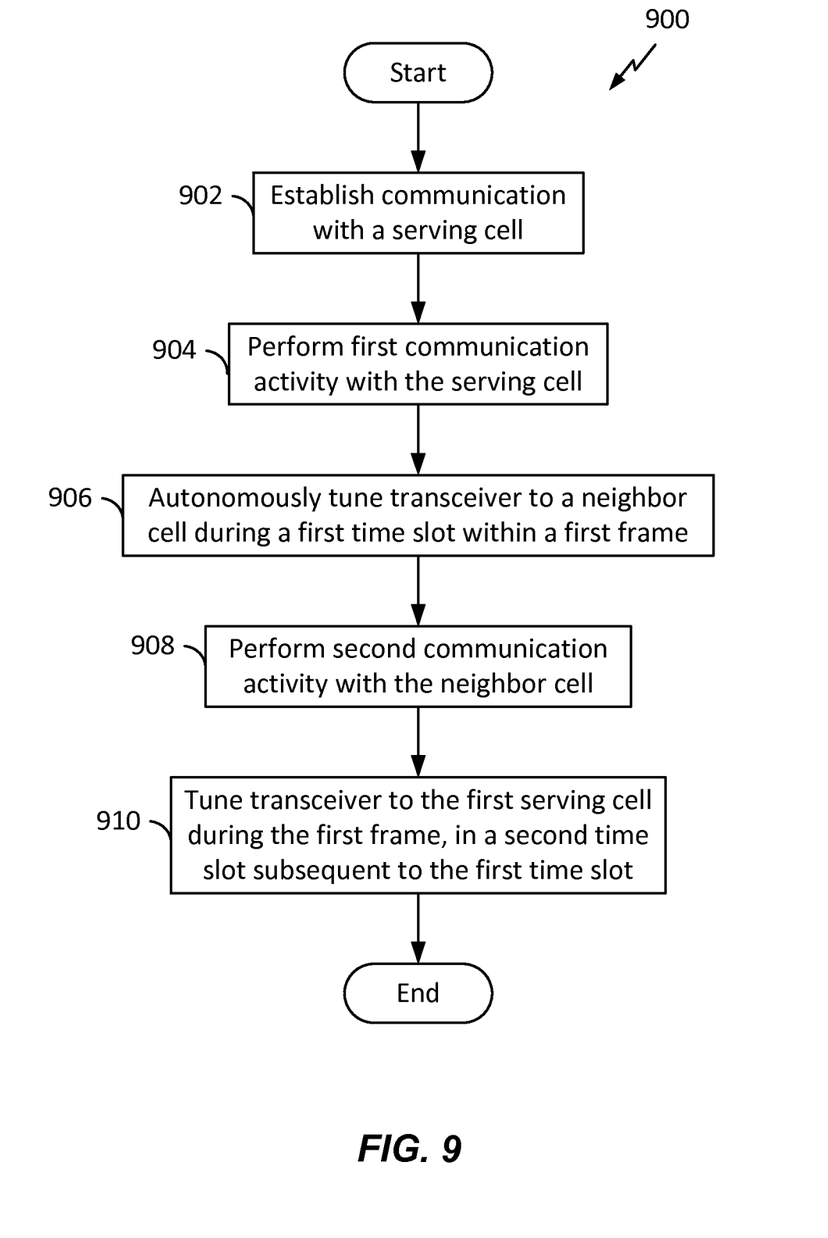
FIG. 9 is a flow chart illustrating the example of the slot-level tune-away operation of FIG. 8 in accordance with some embodiments.

FIG. 9 is a flow chart illustrating an exemplary process 900 operable at a UE 110 that includes a single USIM 111, for implementing a slot-level tune-away operation in accordance with an aspect of the disclosure. As described herein, the tune-away operation described in the process 900 may be performed independently at the UE 110, without necessitating signaling or other communication with any other node in the communication network informing the network that the tune-away operation is to take place. That is, the serving cell 802 may continue transmitting and/or expecting to receive information while the UE 110 is tuned away, yet because the transceiver 310 at the UE 110 is not tuned to the serving cell 802 at this time, such data will generally be lost. However, conventional error handling procedures can enable such data loss to be minimized.

At step 902 the UE 110 may establish communication with the serving cell 802. For example, a physical radio connection may be established with a base station within a radio access network, such as the BTS 108 in the GERAN 102. At step 904, the UE 110 may perform a first communication activity with the serving cell 802, for example, including any suitable voice and/or data call. Here, the call established at step 902 may utilize subscription information stored at a first USIM 111A.

At step 906, the transceiver 310 at the UE 110 may autonomously tune to a neighbor cell 804 during a first time slot within a first frame; and at step 908, the UE 110 may perform a second communication activity with the neighbor cell 804. Here, the neighbor cell 804 may, for example, be a neighboring BTS 108 within the GERAN 102. Further, as described above, the second communication activity may include any suitable activity that the UE 110 may wish to undertake as it is tuned to the second channel, including but not limited to decoding a page message, decoding broadcast information, performing SMS messaging, etc.

At step 910, the transceiver 310 at the UE 110 may tune to the serving cell 802 during the first frame, in a second time slot subsequent to the first time slot. The timing of the tuning back to the serving cell 802 described at step 910 may be determined at the UE 110, and may correspond to the completion of the second communication activity at the neighbor cell 804, or may be predetermined at the UE 110 based on any suitable factors, such as a maximum desired tune-away time, a maximum data loss at the transfer sub 602, etc.

Several aspects of a telecommunications system have been presented with reference to a GSM system. As those skilled in the art will readily appreciate, various aspects described throughout this disclosure may be extended to other telecommunication systems, network architectures and communication standards.

By way of example, various aspects may be extended to UMTS systems such as TD-SCDMA and TD-CDMA. Various aspects may also be extended to systems employing Long Term Evolution (LTE) or LTE-Advanced (LTE-A) (in TDD mode), CDMA2000, Evolution-Data Optimized (EV-DO), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication operable at a user equipment (UE), comprising:
    utilizing a transceiver to perform a first wireless communication activity corresponding to a first channel;
    autonomously tuning the transceiver from the first channel to a second channel during a first frame;
    performing a second wireless communication activity corresponding to the second channel; and
    tuning the transceiver from the second channel to the first channel during the first frame,
    wherein both the first channel and the second channel correspond to a first subscription, and wherein the first channel corresponds to a serving cell and the second channel corresponds to a neighbor cell.

2. The method of claim 1, wherein the tuning of the transceiver from the second channel to the first channel is less than or equal to 8 slots after the tuning of the transceiver from the first channel to the second channel.

3. The method of claim 1, further comprising autonomously tuning the transceiver from the first channel to the second channel during each of a plurality of frames, wherein the second wireless communication activity comprises combining at least one packet corresponding to each of the plurality of frames.

4. The method of claim 1, wherein the autonomously tuning the transceiver from the first channel to the second channel is adapted to occur at a time during which a page message is expected to be received on the second channel.

5. The method of claim 1, wherein the autonomously tuning the transceiver from the first channel to the second channel is adapted to occur during a time such that the first wireless communication activity is not expected to transmit or receive a packet until the tuning of the transceiver from the second channel to the first channel.

6. The method of claim 1, wherein time slots corresponding to the first channel are un-aligned with time slots corresponding to the second channel.

7. The method of claim 1, wherein the second communication activity corresponds to at least one of decoding a paging message, decoding broadcasted system information, or performing SMS messaging.

8. The method of claim 1, wherein the first communication activity corresponds to a voice call utilizing the first subscription.

9. The method of claim 1, wherein the serving cell corresponds to a first carrier frequency, and the neighbor cell corresponds to a second carrier frequency different from the first carrier frequency.

10. A wireless communication device, comprising:
at least one processor;
a memory communicatively coupled to the at least one processor; and
a transceiver communicatively coupled to the at least one processor,
wherein the at least one processor is configured to:
utilize the transceiver to perform a first wireless communication activity corresponding to a first channel;
autonomously tune the transceiver away from the first channel to a second channel during a first frame;
utilize the transceiver to perform a second wireless communication activity corresponding to the second channel; and
tune the transceiver from the second channel to the first channel during the first frame,
wherein both the first channel and the second channel correspond to a first subscription, and wherein the first channel corresponds to a serving cell and the second channel corresponds to a neighbor cell.

11. The wireless communication device of claim 10, further comprising a plurality of USIMs operatively coupled to the transceiver.

12. The wireless communication device of claim 10, wherein the at least one processor, being configured to tune the transceiver from the second channel to the first channel, is further configured to tune the transceiver from the second channel to the first channel in less than or equal to 8 slots after the tuning of the transceiver from the first channel to the second channel.

13. A wireless communication device, comprising:
means for storing a first subscriber identity corresponding to a first channel;
means for storing a second subscriber identity corresponding to a second channel; and
means for performing a first wireless communication activity corresponding to the first channel,
wherein the means for performing the first wireless communication activity is further configured to autonomously tune from the first channel to the second channel during a first frame, to perform a second wireless communication activity corresponding to the second channel, and to tune from the second channel to the first channel during the first frame,
wherein both the first channel and the second channel correspond to a first subscription, and wherein the first channel corresponds to a serving cell and the second channel corresponds to a neighbor cell.

14. The wireless communication device of claim 13, wherein the means for performing the first wireless communication activity, being configured to tune from the second channel to the first channel, is further configured to tune from the second channel to the first channel in less than or equal to 8 slots after the tuning from the first channel to the second channel.

15. A non-transitory computer-readable storage medium comprising instructions for causing a computer to:
utilize a transceiver to perform a first wireless communication activity corresponding to a first channel;
autonomously tune the transceiver away from the first channel to a second channel during a first frame;
utilize the transceiver to perform a second wireless communication activity corresponding to the second channel; and
tune the transceiver from the second channel to the first channel during the first frame,
wherein both the first channel and the second channel correspond to a first subscription, and wherein the first channel corresponds to a serving cell and the second channel corresponds to a neighbor cell.

16. The non-transitory computer-readable storage medium of claim 15, further comprising instructions for causing a computer to tune the transceiver from the second channel to the first channel in less than or equal to 8 slots after the tuning of the transceiver from the first channel to the second channel.

17. In a system configured for wireless communication that comprises components that wirelessly communicate with each other including a communication device, the communication device comprising a transceiver circuit configured to:
tune between multiple communication channels such that the transceiver circuit performs a first wireless communication activity using a first channel;
autonomously tune away from the first channel during a frame to perform a second wireless communication activity using a second channel; and
tune away from the second channel back to the first channel during the frame,
wherein both the first channel and the second channel correspond to a first subscription, and wherein the first channel corresponds to a serving cell and the second channel corresponds to a neighbor cell.

18. The communication device of claim 17, being configured to host two or more USIMs.

* * * * *